(12) United States Patent
Tarng et al.

(10) Patent No.: US 8,102,296 B2
(45) Date of Patent: Jan. 24, 2012

(54) ELECTROMAGNETIC CONDUCTOR REFLECTING PLATE AND ANTENNA ARRAY THEREOF AND RADAR THEREOF AND COMMUNICATION APPARATUS THEREOF

(75) Inventors: Jenn-Hwan Tarng, Hsinchu (TW); Li-Yuan Chang, Taipei (TW); Chin-Chung Nien, Hsinchu (TW); Ya-Chung Yu, Chiayi (TW); Jun-Yen Huang, Yunlin County (TW)

(73) Assignee: Industrial Technology Research Institute, Hsinchu, Taiwan (TW)

( * ) Notice: Subject to any disclaimer, the term of this patent is extended or adjusted under 35 U.S.C. 154(b) by 0 days.

(21) Appl. No.: 12/717,099

(22) Filed: Mar. 3, 2010

(65) Prior Publication Data
US 2011/0122018 A1 May 26, 2011

(30) Foreign Application Priority Data
Nov. 24, 2009 (TW) ................. 98140003 A

(51) Int. Cl.
*H01Q 15/00* (2006.01)
(52) U.S. Cl. ........................... 342/5; 342/179

(58) Field of Classification Search ............... 342/5–12, 342/179
See application file for complete search history.

(56) References Cited

U.S. PATENT DOCUMENTS

| | | | |
|---|---|---|---|
| 5,385,623 A * | 1/1995 | Diaz | 156/197 |
| 6,774,867 B2 | 8/2004 | Diaz et al. | |
| 6,853,350 B2 | 2/2005 | Alexopoulos et al. | |
| 7,463,213 B2 | 12/2008 | Nakano et al. | |
| 2005/0146402 A1* | 7/2005 | Sarabandi et al. | 333/219 |
| 2008/0317277 A1* | 12/2008 | Herrick | 382/100 |
| 2009/0124294 A1* | 5/2009 | Kim et al. | 455/566 |

* cited by examiner

*Primary Examiner* — Timothy A Brainard
(74) *Attorney, Agent, or Firm* — Jianq Chyun IP Office

(57) ABSTRACT

An exemplary example of the present disclosure proposes an electromagnetic conductor reflecting plate including a perfect electronic conductor and at least two artificial magnetic conductors, wherein the each of the artificial magnetic conductor is disposed on arbitrary one side of the perfect electronic conductor, and a boundary between the perfect electronic conductor and each of the artificial magnetic conductor forms a virtual radiation unit. In addition, an exemplary example of the present disclosure further proposes an antenna array including an antenna and the electromagnetic conductor reflecting plate, wherein the antenna is disposed on the electromagnetic conductor reflecting plate.

18 Claims, 12 Drawing Sheets

ELECTROMAGNETIC CONDUCTOR REFLECTING PLATE AND ANTENNA ARRAY THEREOF AND RADAR THEREOF AND COMMUNICATION APPARATUS THEREOF

CROSS-REFERENCE TO RELATED APPLICATION

This application claims the priority benefit of Taiwan application serial no. 98140003, filed on Nov. 24, 2009. The entirety of the above-mentioned patent application is hereby incorporated by reference herein and made a part of specification.

BACKGROUND

1. Technical Field

The present disclosure generally relates to a structure of an antenna array, and more particularly to an electromagnetic conductor reflecting plate, an antenna array using the electromagnetic conductor reflecting plate, and a radar and a communication apparatus using the antenna array.

2. Related Art

Along with the development of the communication technology, the antenna is seen in the usual life. To focus the energy of the antenna, the antenna array having the reflector is generally designed in the communication apparatus, such that the gain of the antenna is improved. However, the trend of the communication apparatus of every kind is toward to the slim and small size, and therefore the required size of the antenna is becoming smaller. Under the condition that the microminiaturized antenna with the high gain must be used, since the reflecting plate is generally confined in a limited space, the energy of the reflecting wave can not be focused fully and completely, and the antenna gain is thus decreased.

In addition to the communication apparatus, the radar generally adapts the large reflector, such as the parabolic reflector having the perfect electronic conductor (hereinafter abbreviated as "PEC") or the artificial magnetic conductor (hereinafter abbreviated as "AMC"), such that the antenna gain is increased. Unfortunately, the size of the above reflector is large, and thus the manufacturing cost thereof is higher.

When the antenna adapts the PEC reflector, the tangent electric field at the boundary is zero, and the distance between the antenna and the PEC reflector is the odd multiple of the one-fourth wavelength of the radiated wave, but not zero, such that a set of the mirror currents having the same current phase is induced, and the phase of the reflected wave is identical to the phase of the incident wave. Although the manner can increase the energy of the reflected wave, it can not efficiently increase the antenna gain. In other words, regarding the antenna array having the PEC reflector as the reflecting plate, the distance between the antenna and the PEC reflector can not be too close, or the antenna gain is much decreased owing to the interference between the incident wave and the reflected wave.

Furthermore, another conventional antenna arrays adapting the perfect magnetic conductor (hereinafter abbreviated as PMC) reflecting plates are provided by U.S. Pat. No. 6,774,867, U.S. Pat. No. 6,853,350, and U.S. Pat. No. 7,463,213. In U.S. Pat. No. 6,853,350, the antenna is placed in the magnetic interface, and a radial current having the phase identical to that of the radiated wave is generated, such that the antenna reflection is improved. In U.S. Pat. No. 7,463,213, the antenna is placed in the PMC having the periodical high impedance, such that the antenna directivity is improved.

Regarding the antenna array using the PEC reflecting plate, the distance between the antenna and the PEC reflecting plate is the odd multiple of the one-fourth wavelength of the radiated wave, but not zero, and thus the position of the antenna can not be too close to the PEC reflecting plate. On the contrary, regarding the antenna array using the PMC reflecting plate, the distance between the antenna and the PMC reflecting plate is the multiple of the half wavelength of the radiated wave or zero, and thus the position of the antenna must be close to the PMC reflecting plate as far as possible.

SUMMARY

An exemplary example of the present disclosure provides an electromagnetic conductor reflecting plate including a perfect electronic conductor and at least two artificial magnetic conductors, wherein the each of the artificial magnetic conductor is disposed on arbitrary one side of the perfect electronic conductor, and a boundary between the perfect electronic conductor and each of the artificial magnetic conductor forms a virtual radiation unit.

In addition, an exemplary example of the present disclosure also provides an antenna array including an antenna and the electromagnetic conductor reflecting plate, wherein the antenna is disposed on the electromagnetic conductor reflecting plate.

Furthermore, exemplary examples of the present disclosure further provide a radar and a communication apparatus using the antenna array above, wherein the radar comprises the antenna array above and an imaging unit, and the imaging unit is used to transceive the a radiated wave to be transceived by the antenna array; the communication apparatus comprises the antenna array above and a communication unit, and the communication unit is used to encode, decode, modulate, or demodulate a radiated wave to be transceived by the antenna array.

It is to be understood that both the foregoing general description and the following detailed description are exemplary, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate exemplary examples of the present disclosure and, together with the description, serve to explain the principles of the present disclosure.

DESCRIPTION OF THE EXEMPLARY EXAMPLES

Figure 1:
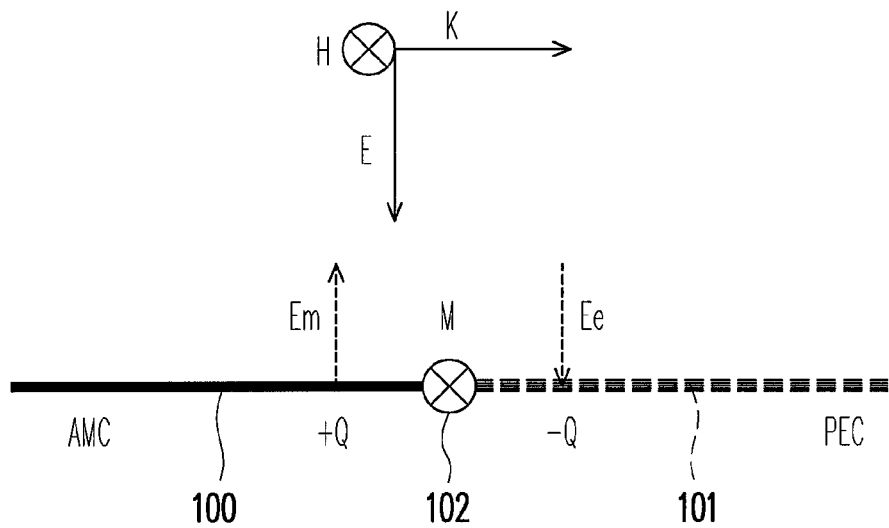
FIG. 1 is a schematic diagram showing a direction of a magnetic flux at a boundary between an AMC and a PEC.

Reference will now be made in detail to exemplary examples of the present disclosure, and exemplary examples of which are illustrated in the accompanying drawings. Wherever possible, the same reference numbers are used in the drawings and the description to refer to the same or like parts.

An exemplary example of the present disclosure provides a reflecting plate which is designed by combining boundary conditions of a PEC and an AMC. An antenna is placed on the reflecting plate to form an antenna array with high antenna gain, wherein the reflecting plate which is designed by combining boundary conditions of a PEC and an AMC is named an electromagnetic conductor reflecting plate.

When the radiated wave propagates to the electromagnetic conductor reflecting plate, the electromagnetic conductor reflecting plate equivalently generates a plurality of virtual radiation units. Thus, while the space positions of AMCs and PEC are appropriately designed, the number of the generated virtual radiation units and the synthesized radiation pattern can be under control, such that the antenna gain is increased. In addition, it is noted that, the PMC does not existed in nature world, and only the AMC similar to the PMC exists in nature world. Accordingly, the AMC described in the present disclosure is substantially identical to the PMC.

First, referring to FIG. 1, FIG. 1 is a schematic diagram showing a direction of a magnetic flux at a boundary between an AMC and a PEC. In FIG. 1, the propagating direction K of the incident wave is toward right, and directions of the electric field E and magnetic file H of the incident wave are respectively toward down and inner. The electric fields $E_m$ and $E_e$ of the AMC 100 and PEC 101 are respectively toward up and down, and according to the derivation of the Maxwell equation, it is known that the magnetic flux on the boundary 102 between the AMC 100 and PEC 101 is toward inner. It is noted that, the virtual radiation unit is the boundary 102 between the AMC 100 and PEC 101, the boundary 102 is the reflecting source, and thus the boundary 102 is equivalently the virtual radiation unit in the antenna array.

Figure 2:
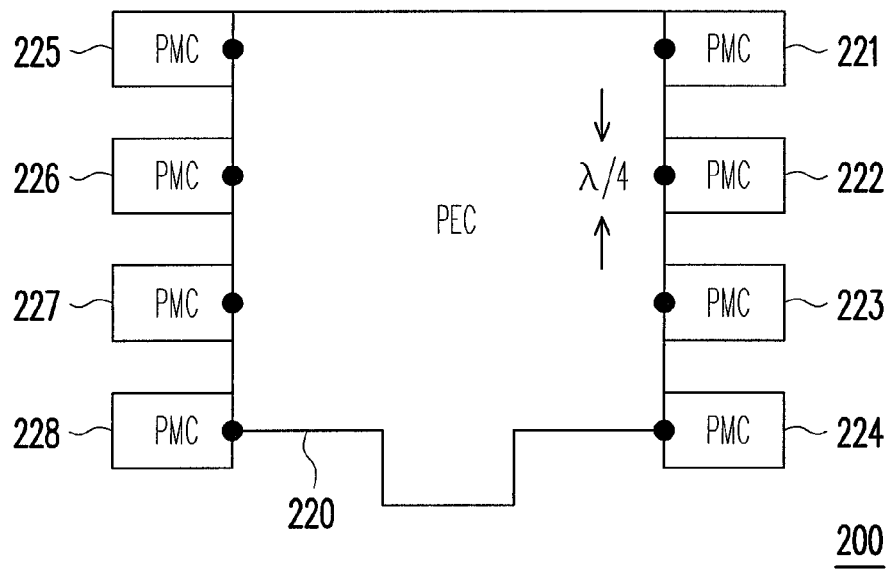
FIG. 2 is a schematic diagram showing a structure of an electromagnetic conductor reflecting plate of an antenna array according to one exemplary example of the present disclosure.

Next, referring to FIG. 2, FIG. 2 is a schematic diagram showing a structure of an electromagnetic conductor reflecting plate of an antenna array according to one exemplary example of the present disclosure. In FIG. 2, the electromagnetic conductor reflecting plate 200 comprises PEC 220 and a plurality of AMCs 221-228, wherein the AMCs 221-228 are symmetrically placed on two sides of the PEC 220, the AMCs 221-228 are designed at the same plane, and the distance between the two neighboring AMCs, such as AMCs 221 and 222, is a multiple of a one-fourth wavelength of a radiated wave, but not zero. In addition, the structure of each of the AMCs 221-228 is a two-dimensional substantial structure with three T shapes (shown in FIG. 3 and described in the related description), the eight boundaries between the AMCs 221-228 and PEC 220 can be eight virtual radiation units equivalently. The antenna can be placed on the electromagnetic conductor reflecting plate 200 to form an antenna array, and in the exemplary example, the antenna can be placed on the center of the electromagnetic conductor reflecting plate 200.

It is noted that, FIG. 2 merely illustrates one exemplary example of the present disclosure, and in fact, the number of the AMCs, the structures of the AMCs, the distance between the AMCs, and placed position s of the AMCs illustrated in FIG. 2 are not used to limit the present disclosure. In addition, the placed position of the antenna is also not used to limit the present disclosure. The number of the AMCs must be larger than two, but has no upper limitation. The AMCs may be asymmetrically placed, and the AMCs may be not placed on the two sides of the PEC. The antenna may not be placed on the center of the electromagnetic conductor reflecting plate. In addition, the structure of the AMC may be the combination of a plurality of cycles, ellipsoids, and polygons.

Figure 3:
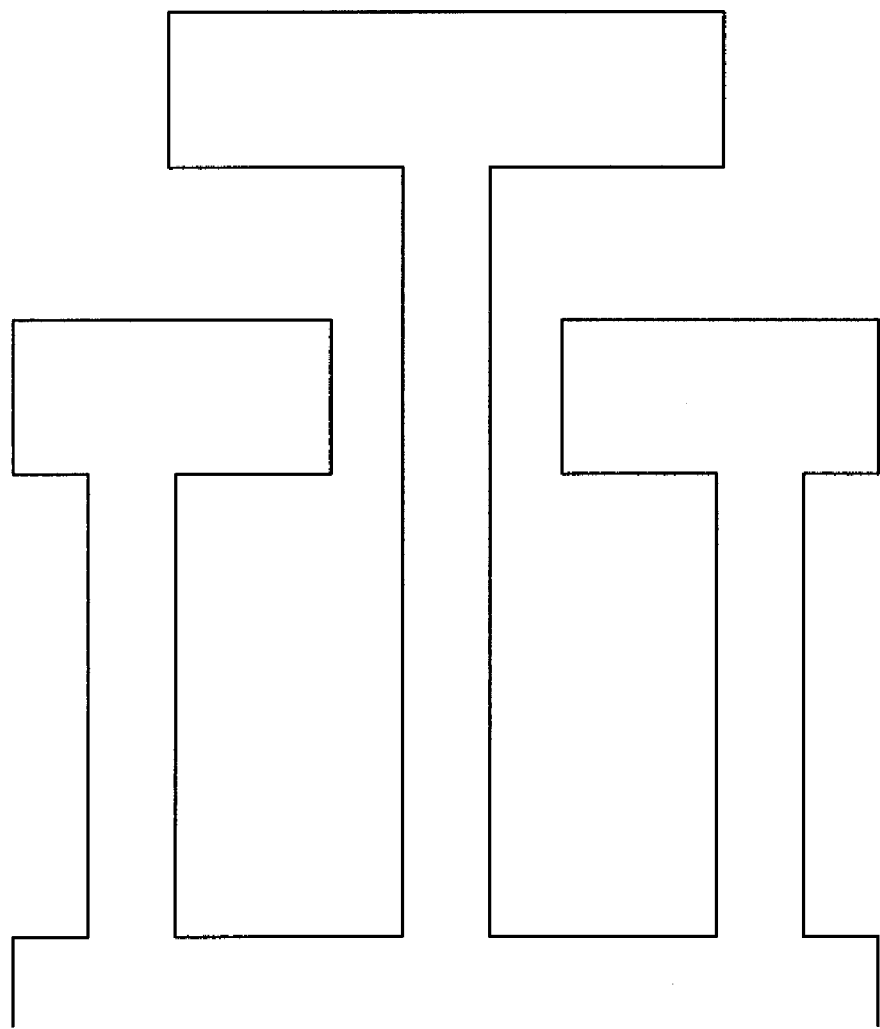
FIG. 3 is a schematic diagram showing a structure of an AMC according to one exemplary example of the present disclosure.

Referring to FIG. 3, FIG. 3 is a schematic diagram showing a structure of an AMC according to one exemplary example of the present disclosure. In FIG. 3, the structure of each of the AMCs 221-228 is a two-dimensional substantial structure with three T shapes. Thus, regarding the radiated wave at the specific frequency band, the characteristic impedance of the AMC approaches infinite, such that the radiated wave can be fully reflected to the space, and this effect is similar to the effect the space filter.

Figure 4:
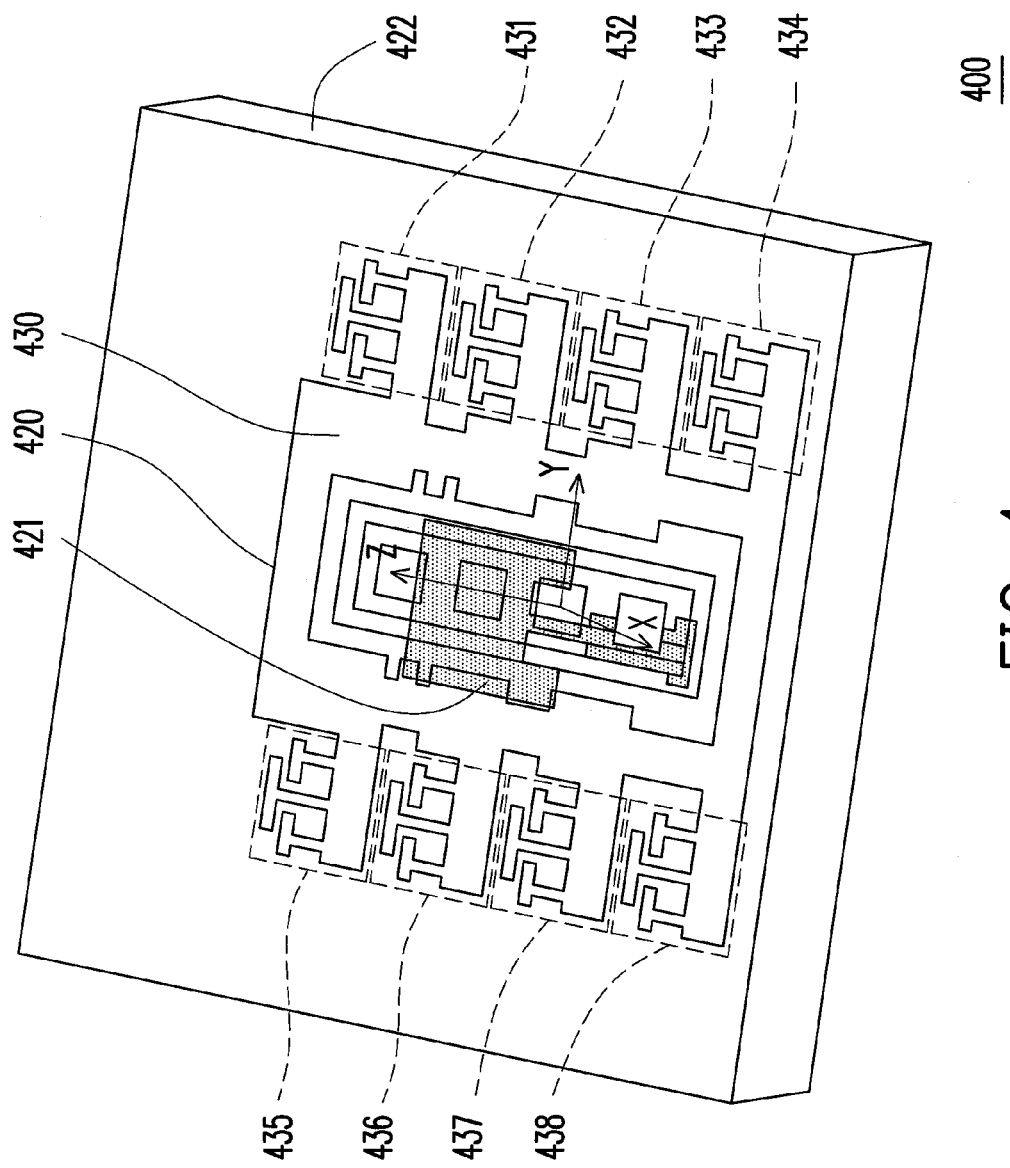
FIG. 4 is a schematic diagram showing a structure of an antenna array according to one exemplary example of the present disclosure.

Next, referring to FIG. 4, FIG. 4 is a schematic diagram showing a structure of an antenna array according to one exemplary example of the present disclosure. In FIG. 4, the antenna array 400 comprises an electromagnetic conductor reflecting plate 420 and an antenna 421, wherein the electromagnetic conductor reflecting plate 420 is identical to the electromagnetic conductor reflecting plate 200 in FIG. 2, and the antenna can be placed on the center of the electromagnetic conductor reflecting plate 420. The antenna array 400 further comprises a substrate 422, and the electromagnetic conductor reflecting plate 420 can be placed on the substrate 422.

The electromagnetic conductor reflecting plate 420 comprises a PEC 430 and AMCs 431-438, and as described above, at the specific frequency band, the AMCs 431-438 have the infinite characteristic impedances, such that the radiated wave is fully reflected to the space. Since the effect is similar to the effect of the space filter, the surface magnetic fields of the AMCs 431-438 are zero, and an induced electric filed $E_m$ (referring to FIG. 1) is generated which direction is opposite to the direction of the electric filed $E_e$ of the PEC (referring to FIG. 1). Because the boundary condition that the surface magnetic fields of the AMCs 431-438 are zero is met, the radiated wave is confined in the boundaries of the AMCs 431-438 and 430, such that the generated electric fields $E_e$ and $E_e$ form a loop, and the magnetic flux M is induced on the boundary. Thus the boundaries are the reflecting sources of the electromagnetic conductor reflecting plate 420.

In addition, the distance between two neighbors of the AMCs is the multiple of the one-fourth wavelength of the radiated wave, and therefore the antenna array 400 equivalently has eight virtual radiation units, such that the antenna directivity is improved. Meanwhile, the AMCs 431-438 can suppress the scattering of the radiated wave, and reduce the dielectric loss, such that the radiated wave is confined in the limited space, and the antenna gain is thus increased.

Figure 5:
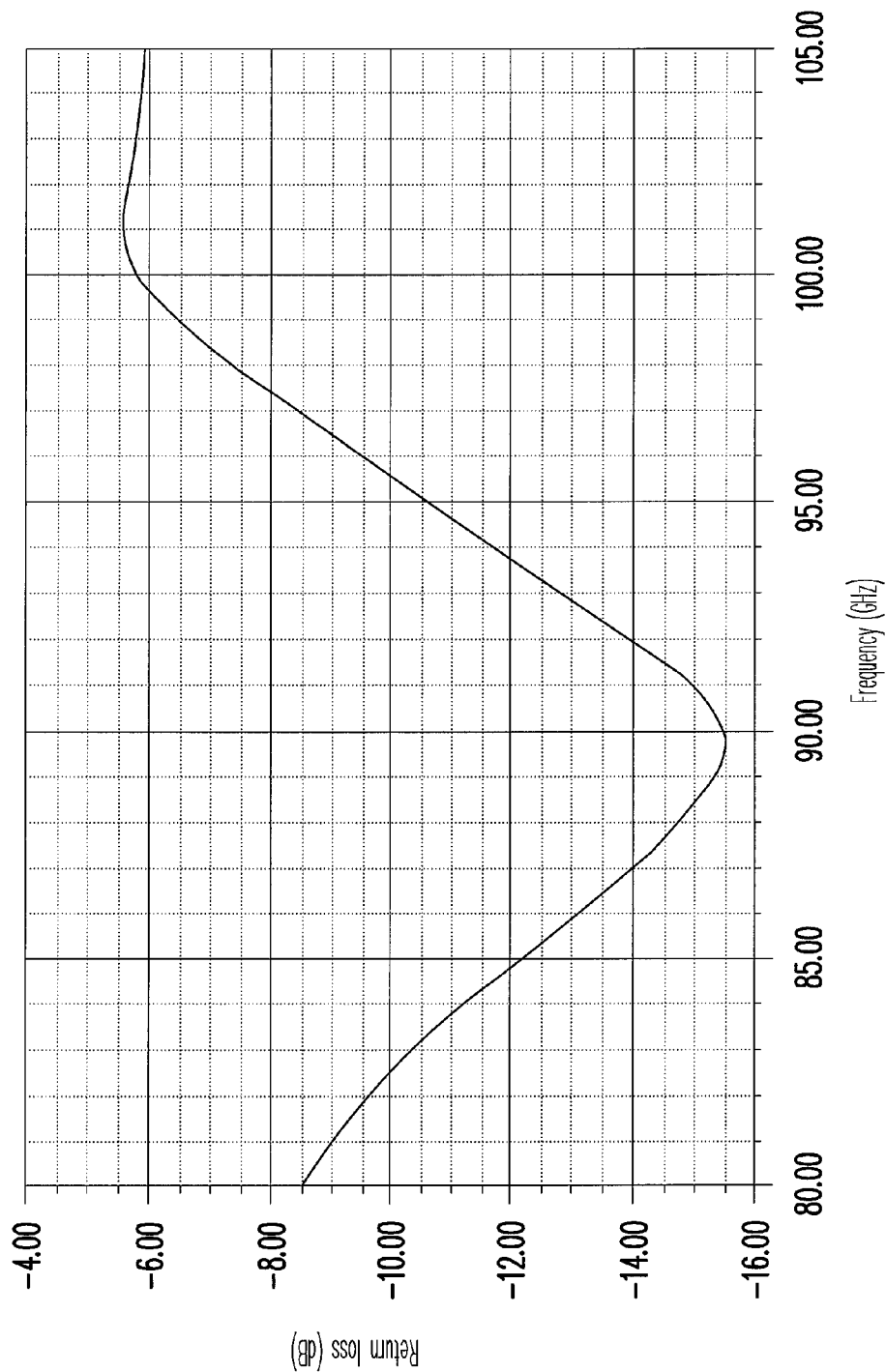
FIG. 5 is a curve diagram showing a return loss of an antenna array according to one exemplary example of the present disclosure.
Figure 6:
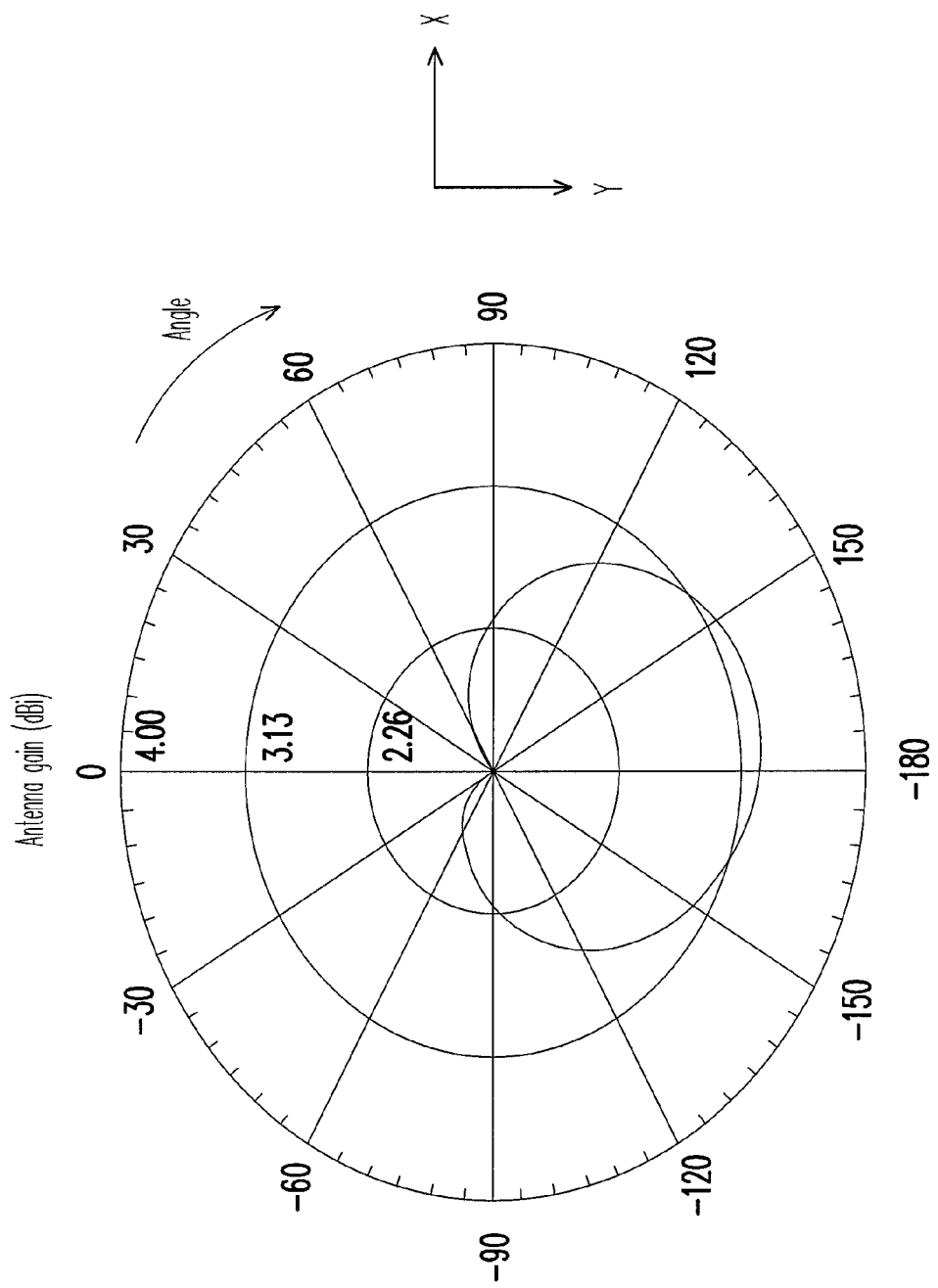
FIG. 6 is a schematic diagram showing an X-Y plane radiation pattern of an antenna array according to one exemplary example of the present disclosure.

Next, referring both of FIG. 5 and FIG. 6, FIG. 5 is a curve diagram showing a return loss of an antenna array according to one exemplary example of the present disclosure, and FIG. 6 is a schematic diagram showing an X-Y plane radiation pattern of an antenna array according to one exemplary example of the present disclosure. The curve diagram of FIG. 5 and the schematic diagram of FIG. 6 correspond to the antenna array 400. In FIG. 5, the antenna array 400 has an about −16 dB return loss at the 90 GHz, and in FIG. 6, the antenna gain antenna array 400 on the X-Y plane (referring to the coordinate of FIG. 4) is large from −150° through −150° (counterclockwise direction). Therefore, it is obvious that the antenna array 400 has the good antenna directivity.

Figure 7:
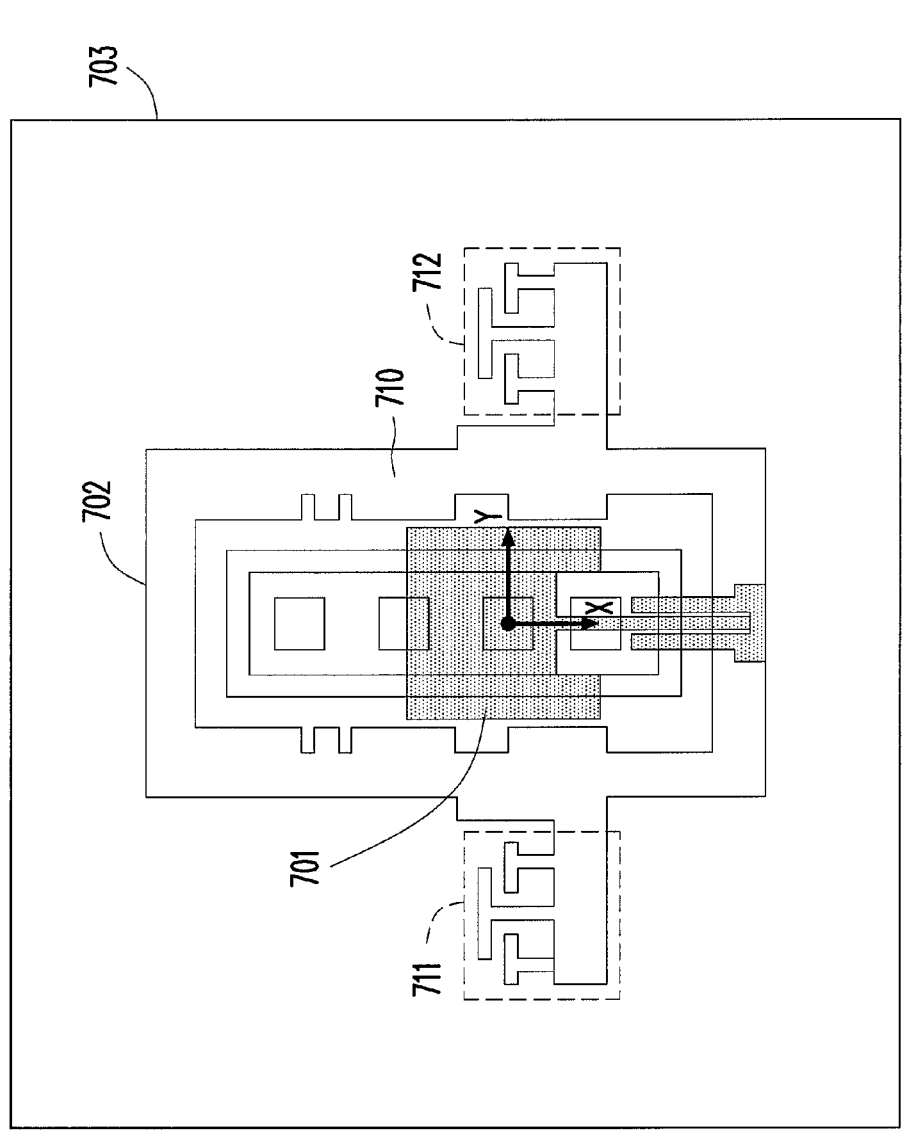
FIG. 7 is a schematic diagram showing a structure of an antenna array according to another one exemplary example of the present disclosure.

Next, referring to FIG. 7, FIG. 7 is a schematic diagram showing a structure of an antenna array according to another one exemplary example of the present disclosure. The antenna array 700 in FIG. 7 comprises an antenna 701, an electromagnetic conductor reflecting plate 702, and a substrate 703, wherein the electromagnetic conductor reflecting plate 702 comprises PEC 710 and AMCs 711, 712. The distance between AMCs 711 and 712 is half wavelength of the radiated wave in Y axis, and the AMCs 711 and 712 are symmetrically placed on the two sides of the PEC 710. In addition, the structure of each of the AMCs 711 and 712 is a two-dimensional substantial structure with three T shapes. The two boundaries between the AMCs 711, 712 and the PEC 710 are equivalently the two virtual radiation units. The antenna 701 can be placed on the center of the electromagnetic conductor reflecting plate 702 so as to form the antenna array 700, and the electromagnetic conductor reflecting plate 702 is placed on the substrate 703.

Figure 8:
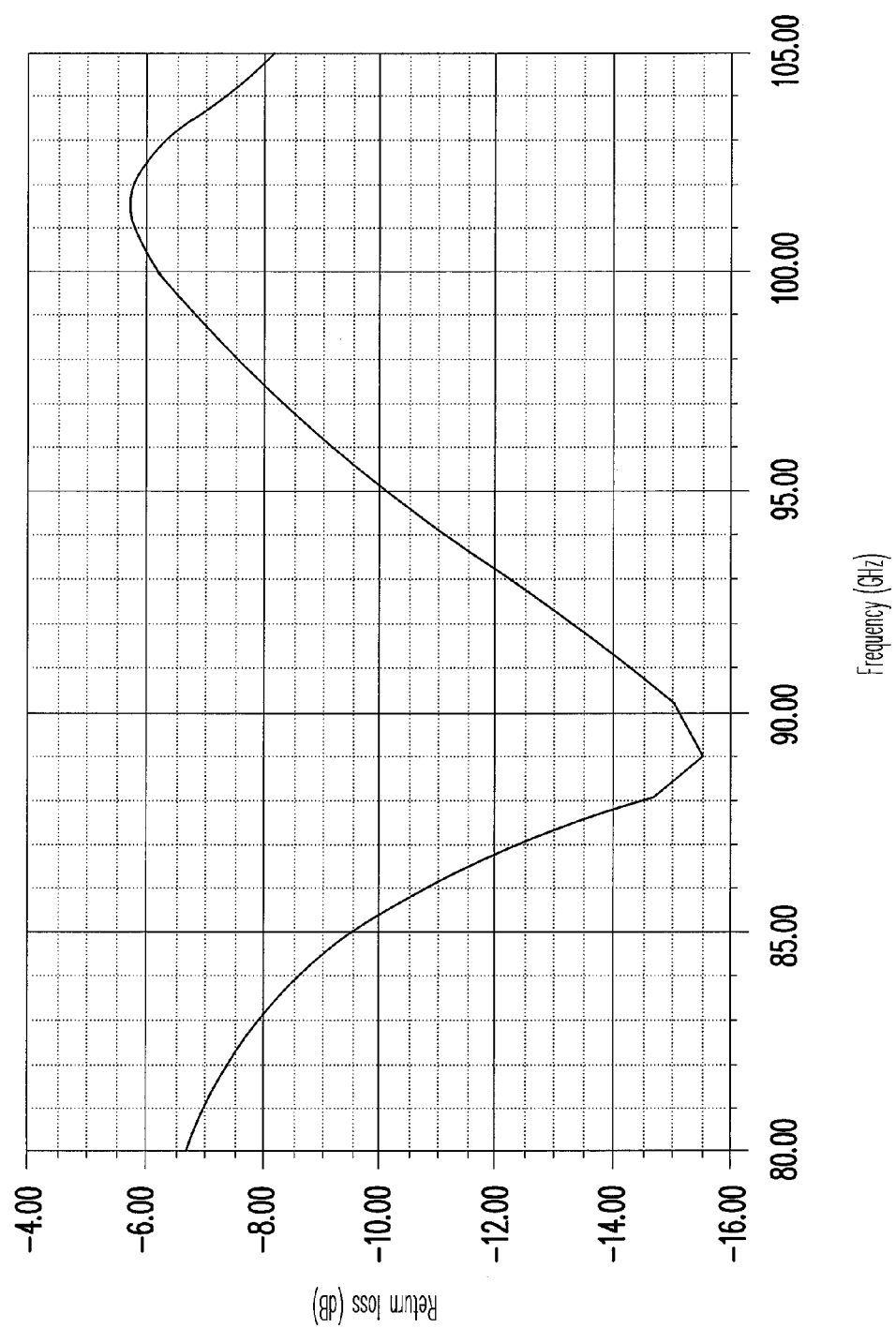
FIG. 8 is a curve diagram showing a return loss of an antenna array according to another one exemplary example of the present disclosure.

The difference between the antenna array 700 and the antenna array 400 in FIG. 4 is that the antenna array 700 merely comprises two AMCs 711 and 712 but the antenna array 400 comprises eight AMCs 211-228. Referring to FIG. 8, FIG. 8 is a curve diagram showing a return loss of an antenna array according to another one exemplary example of the present disclosure. The curve diagram of FIG. 8 corresponds to the antenna array 700 mentioned above. In FIG. 8, the antenna array 700 has an about −16 db return loss at the 89 GHz. In addition, the maximum antenna gain of the antenna array is about 2.5 dBi. The number of the AMCs may affect the antenna directivity of the antenna array. In the exemplary examples of the present disclosure, the larger the number of the AMCs of the antenna array is, the better the antenna directivity is. Therefore, the antenna directivity of the antenna array 700 is worse than that of the antenna array 400.

Figure 9:
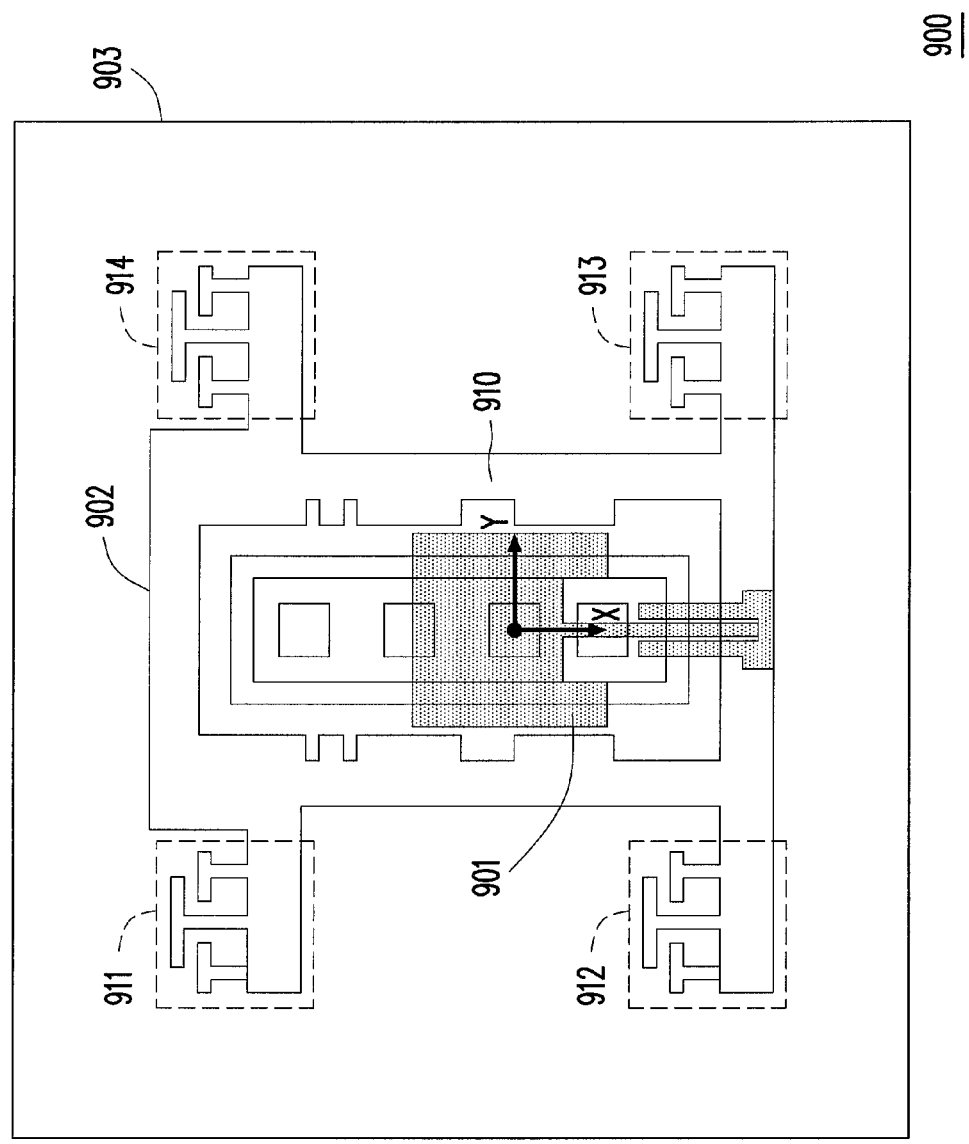
FIG. 9 is a schematic diagram showing a structure of an antenna array according to another one exemplary example of the present disclosure.

Next, referring to FIG. 9, FIG. 9 is a schematic diagram showing a structure of an antenna array according to another one exemplary example of the present disclosure. The antenna array 900 in FIG. 9 comprises an antenna 901, an electromagnetic conductor reflecting plate 902, and a substrate 903, wherein the electromagnetic conductor reflecting plate 702 comprises PEC 710 and AMCs 711, 712. The distance between AMCs 911 and 914 is half wavelength of the radiated wave in Y axis, and the distance between AMCs 912 and 913 is half wavelength of the radiated wave in Y axis. The distance between AMCs 911 and 912 is one-fourth wavelength of the radiated wave in X axis, and the distance between AMCs 913 and 914 is one-fourth wavelength of the radiated wave in X axis. The AMCs 911-914 are symmetrically placed on the two sides of the PEC 910. In addition, the structure of each of the AMCs 911-914 is a two-dimensional substantial structure with three T shapes. The four boundaries between the AMCs 911-914 and the PEC 910 are equivalently the four virtual radiation units. The antenna 901 can be placed on the center of the electromagnetic conductor reflecting plate 902 so as to form the antenna array 900, and the electromagnetic conductor reflecting plate 902 is placed on the substrate 903.

Figure 10:
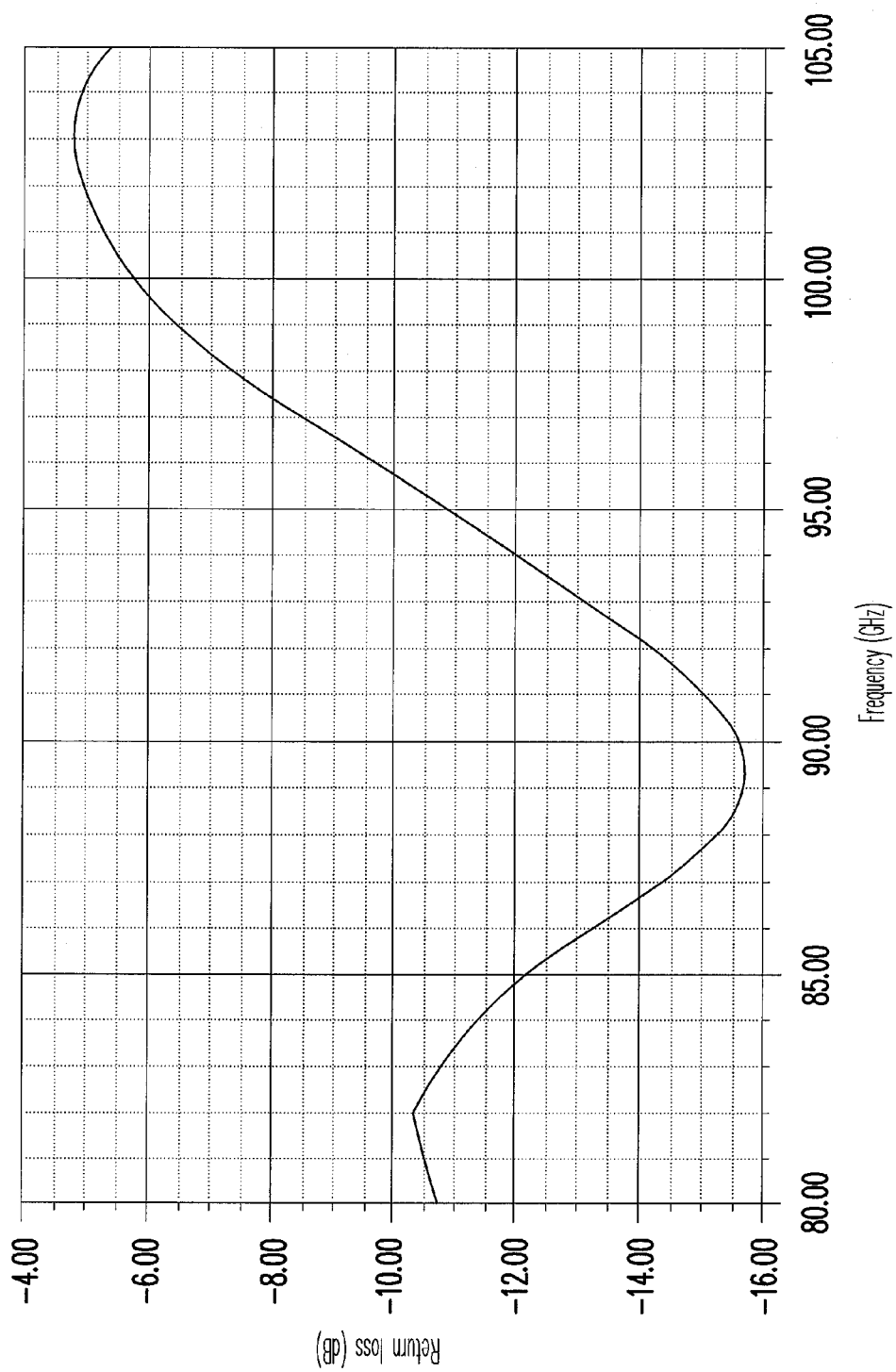
FIG. 10 is a curve diagram showing a return loss of an antenna array according to another one exemplary example of the present disclosure.

The difference between the antenna array 900 and the antenna array 400 in FIG. 4 is that the antenna array 900 merely comprises four AMCs 911-914, but the antenna array 400 comprises eight AMCs 211-228. Referring to FIG. 10, FIG. 10 is a curve diagram showing a return loss of an antenna array according to another one exemplary example of the present disclosure. The curve diagram of FIG. 10 corresponds to the antenna array 900 mentioned above. In FIG. 9, the antenna array 900 has an about −16 db return loss at the 89 GHz. In addition, the maximum antenna gain of the antenna array is about 4.5 dBi. As mentioned above, the number of the AMCs may affect the antenna directivity of the antenna array. In the exemplary examples of the present disclosure, the larger the number of the AMCs of the antenna array is, the better the antenna directivity is. Therefore, the antenna directivity of the antenna arrays 700 and 900 are worse than that of the antenna array 400.

Figure 11:
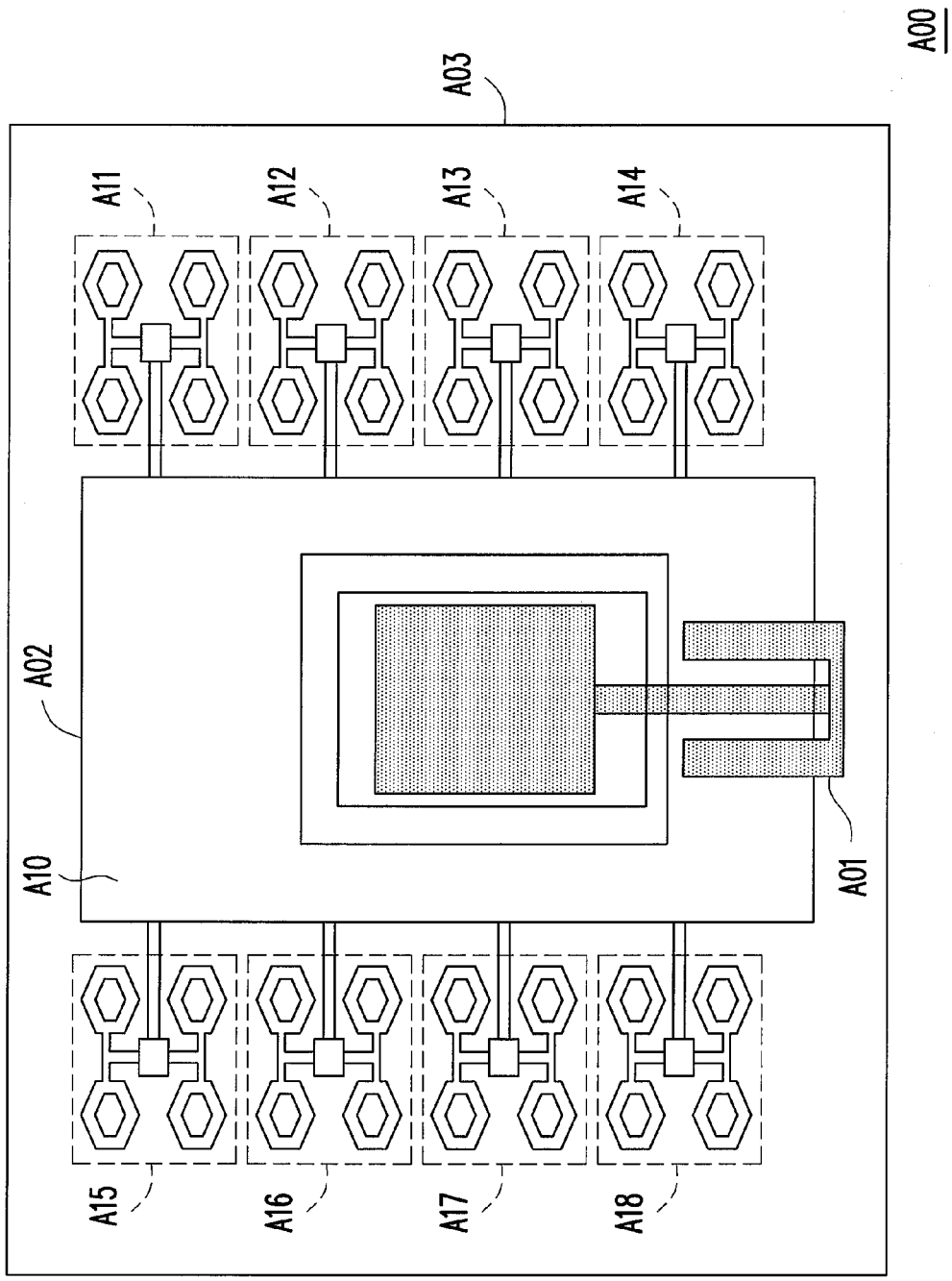
FIG. 11 is a schematic diagram showing a structure of an antenna array according to another one exemplary example of the present disclosure.

Next, referring to FIG. 11, FIG. 11 is a schematic diagram showing a structure of an antenna array according to another one exemplary example of the present disclosure. The antenna array A00 in FIG. 11 comprises an antenna A01, an electromagnetic conductor reflecting plate A02, and a substrate A03, wherein the electromagnetic conductor reflecting plate A02 comprises PEC A10 and AMCs A11-A18. The AMCs A11-A18 are symmetrically placed on the two sides of the PEC A10. The difference between the antenna array 900 and the antenna array 400 in FIG. 4 is that the structure of each of the AMCs A11-418 is a two-dimensional substantial structure with three T shapes, but the structure of each of the AMCs A11-A18 is a structure of each artificial magnetic conductor is a two-dimensional substantial structure with four hexagons. To sum up, the number of the AMCs, the structures of the AMCs, the distance between the AMCs, and placed positions of the AMCs are not used to limit the present disclosure, and the placed position of the antenna is also not used to limit the present disclosure. In addition, though the antenna array operates at the industrial, scientific and medical band (ISM band), the antenna array may operate at another frequency band, such as at the frequency band of 60 GHz, after the antenna array is designed appropriately.

Figure 12:
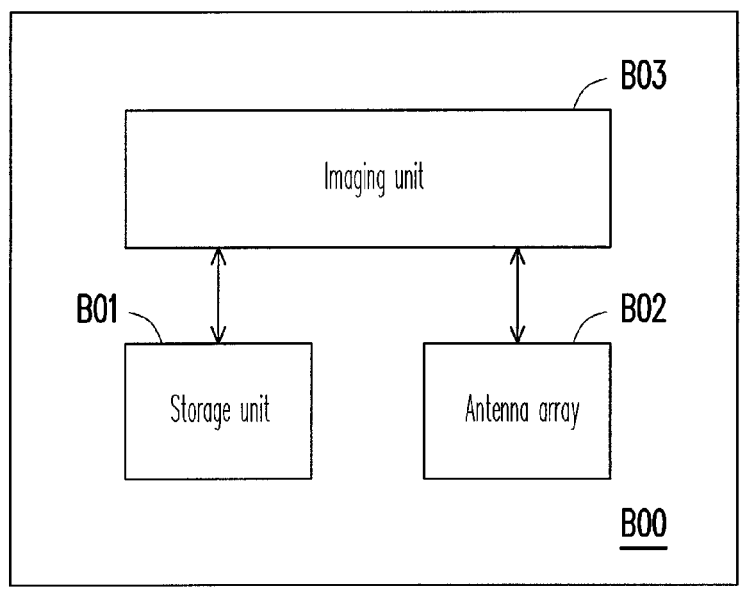
FIG. 12 is a system block diagram showing a radar according to one exemplary example of the present disclosure.

Next, referring to FIG. 12, FIG. 12 is a system block diagram showing a radar according to one exemplary example of the present disclosure. The radar B00 comprises a storage unit B01, an antenna array B02, and an imaging unit B03, wherein the antenna array can be one of the antenna arrays 400, 700, 900, and the other antenna arrays provided or manufactured by the exemplary examples of the present disclosure. The antenna array can transceive the radiated microwave, and the imaging unit B01 calculates the information conveyed on the radiated microwave received by the antenna array B02, so as to render an image according to the radiated microwave received by the antenna array B02. Then the rendered image is stored into the storage unit B01. The radar B00 may be generally applied in the building video camera, the medical video camera, and the other imaging apparatus.

Figure 13:
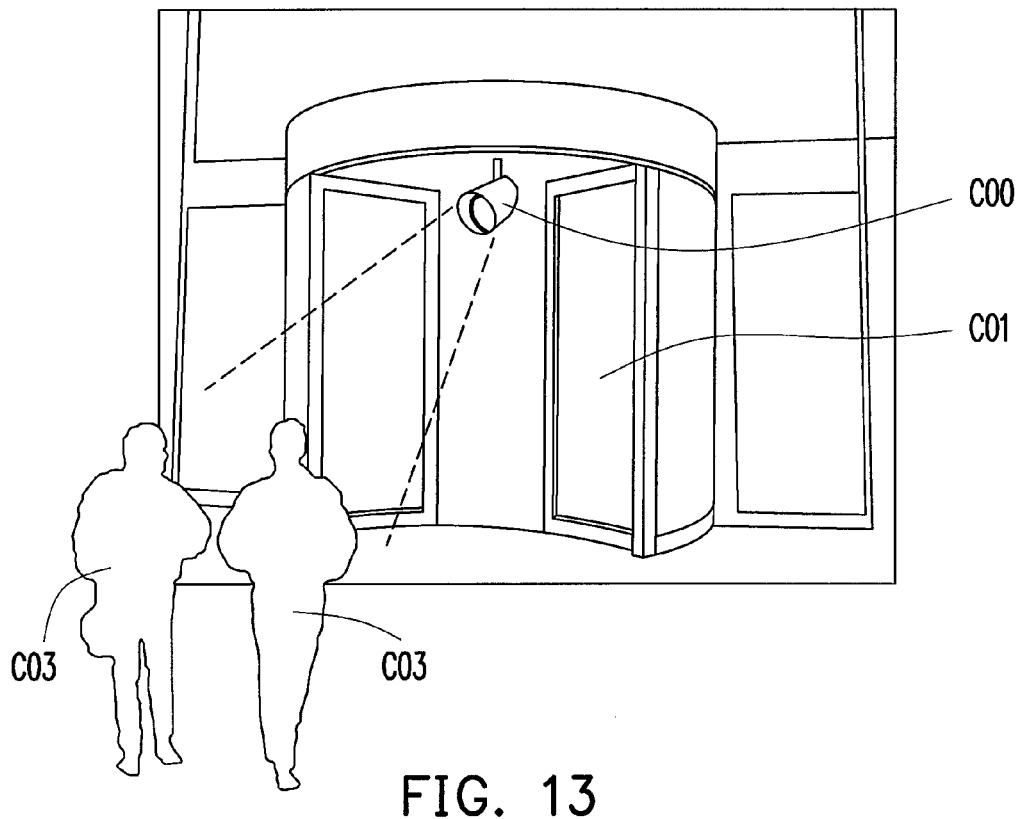
FIG. 13 is a schematic diagram showing an application of an antenna array according to one exemplary example of the present disclosure.
Figure 14:
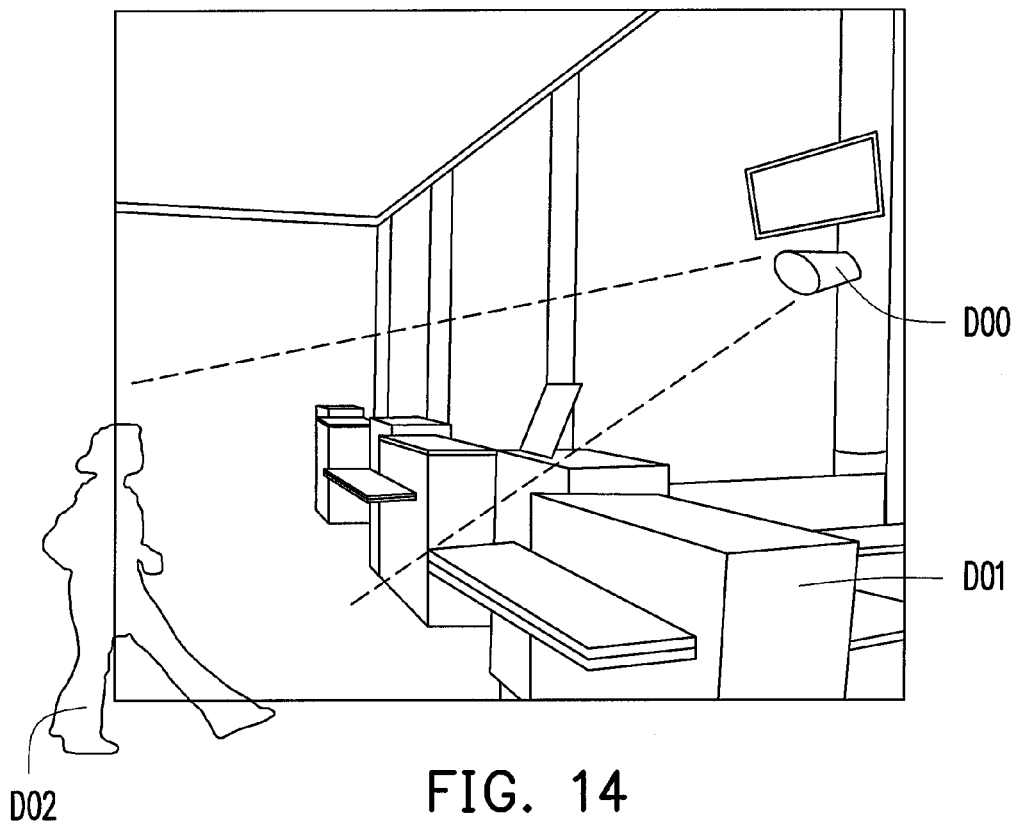
FIG. 14 is a schematic diagram showing an application of an antenna array according to another one exemplary example of the present disclosure.

Next, referring to FIG. 13, FIG. 13 is a schematic diagram showing an application of an antenna array according to one exemplary example of the present disclosure. In FIG. 13, the imaging apparatus C00 is located on the top of important gate C01, wherein the imaging apparatus C00 has the above antenna array and the optical camera lens module. First, the antenna array transmits a radiated wave, and receives the reflected wave from guest C02, so as to perform a coarse detection on the guest. The imaging apparatus C00 then executes the back-end detection algorithm to trigger the optical camera lens module to take a photograph to the suspicious guest. Next, referring to FIG. 14, FIG. 14 is a schematic diagram showing an application of an antenna array according to another one exemplary example of the present disclosure. In FIG. 14, the imaging apparatus D00 having the above antenna array and the optical camera lens module is fixed on the bank cabinet D01, so as to detect the guest D02.

Figure 15:
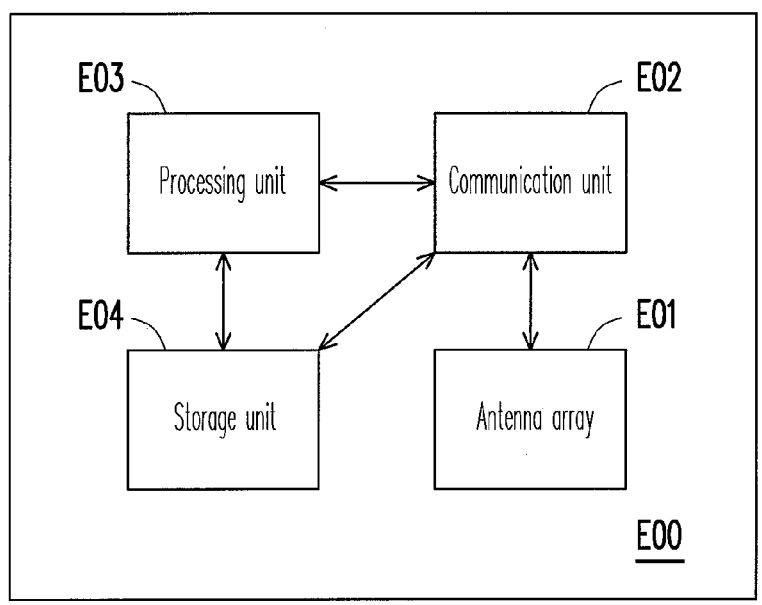
FIG. 15 is a system block diagram showing a communication apparatus according to one exemplary example of the present disclosure.

Next, referring to FIG. 15, FIG. 15 is a system block diagram showing a communication apparatus according to one exemplary example of the present disclosure. The communication apparatus E00 comprises an antenna array E01, a communication unit E01, a processing unit E03, and a storage unit E04, wherein the antenna array E01 is one of the antenna arrays provided or manufactured by the exemplary examples of the present disclosure. The antenna array E01 is used to transceive the radiated wave, and the communication unit E02 is used to encode, decode, modulate, or demodulate the radiated wave. The processing unit E03 is used to process the data to be transmitted to the communication unit E02 or the data received from communication unit E02. The storage unit is used to store the data and the required information for processing. The communication apparatus E00 is a wireless access point, a base station, a mobile phone, a wireless network card, or a netbook.

Accordingly, the electromagnetic conductor reflecting plate of the antenna array provided by one exemplary example of the present disclosure can generate a plurality of virtual radiation units to increase the antenna gain, and thus the volume size of the antenna array is efficiently decreased. The costs of the radar and the communication apparatus using the antenna array are much reduced, and the radar and the communication apparatus can have the high antenna gain.

It will be apparent to those skilled in the art that various modifications and variations can be made to the exemplary example without departing from the scope or spirit of the present disclosure. In view of the foregoing descriptions, it is intended that the present disclosure covers modifications and variations of the present disclosure if they fall within the scope of the following claims and their equivalents.

What is claimed is:

1. An electromagnetic conductor reflecting plate, comprising:
   a perfect electronic conductor; and
   at least two artificial magnetic conductors, wherein a structure of each artificial magnetic conductor is a two-dimensional substantial structure, the artificial magnetic conductors are symmetrically placed on the two sides of the perfect electronic conductor, and a virtual radiation unit is formed on a boundary between the perfect electronic conductor and each artificial magnetic conductor.

2. The electromagnetic conductor reflecting plate according to claim 1, wherein the structure of each artificial magnetic conductor is a two-dimensional substantial structure with three T shapes.

3. The electromagnetic conductor reflecting plate according to claim 1, wherein the structure of each artificial magnetic conductor is a two-dimensional substantial structure with four hexagons.

4. The electromagnetic conductor reflecting plate according to claim 1, wherein the distance between the two opposite artificial magnetic conductors is a multiple of a half wavelength of a radiated wave, but not zero.

5. The electromagnetic conductor reflecting plate according to claim 1, wherein a number of the artificial magnetic conductors is two, four, or eight.

6. The electromagnetic conductor reflecting plate according to claim 1, wherein the distance between the two neighboring artificial magnetic conductors on the same side of perfect electronic conductor is a multiple of a one-fourth wavelength of a radiated wave, but not zero.

7. The electromagnetic conductor reflecting plate according to claim 1, wherein the boundary between the perfect electronic conductor and each artificial magnetic conductor has an induced current.

8. An antenna array, comprising:
   an electromagnetic reflecting plate, comprising:
      a perfect electronic conductor; and
      at least two artificial magnetic conductors, wherein a structure of each artificial magnetic conductor is a two-dimensional substantial structure, the artificial magnetic conductors are symmetrically placed on the two sides of the perfect electronic conductor, and a virtual radiation unit is formed on a boundary between the perfect electronic conductor and each artificial magnetic conductor; and
   an antenna, placed on the electromagnetic reflecting plate.

9. The antenna array according to claim 8, wherein the structure of each artificial magnetic conductor is a two-dimensional substantial structure with three T shapes.

10. The antenna array according to claim 8, wherein the structure of each artificial magnetic conductor is a two-dimensional substantial structure with four hexagons.

11. The antenna array according to claim 8, wherein the distance between the two opposite artificial magnetic conductors is a multiple of a half wavelength of a radiated wave, but not zero.

12. The antenna array according to claim 8, wherein a number of the artificial magnetic conductors is two, four, or eight.

13. The antenna array according to claim 8, wherein the distance between the two neighboring artificial magnetic conductors on the same side of perfect electronic conductor is a multiple of a one-fourth wavelength of a radiated wave, but not zero.

14. The antenna array according to claim 8, wherein the boundary between the perfect electronic conductor and each artificial magnetic conductor has an induced current.

15. A radar, comprising:
   an antenna array, comprising:
      an electromagnetic reflecting plate, comprising:
         a perfect electronic conductor; and
         at least two artificial magnetic conductors, wherein a structure of each artificial magnetic conductor is a two-dimensional substantial structure, the artificial magnetic conductors are symmetrically placed on the two sides of the perfect electronic conductor, and a virtual radiation unit is formed on a boundary between the perfect electronic conductor and each artificial magnetic conductor; and an antenna, placed on the electromagnetic reflecting plate; and an imaging unit, for transceiving a radiated wave to be transceived by the antenna array.

16. The radar according to claim 15, wherein the radar is used in an imaging apparatus.

17. A communication apparatus, comprising:
an antenna array, comprising:
an electromagnetic reflecting plate, comprising:
a perfect electronic conductor; and
at least two artificial magnetic conductors, wherein a structure of each artificial magnetic conductor is a two-dimensional substantial structure, the artificial magnetic conductors are symmetrically placed on the two sides of the perfect electronic conductor, and a virtual radiation unit is formed on a boundary between the perfect electronic conductor and each artificial magnetic conductor; and an antenna, placed on the electromagnetic reflecting plate; and a communication unit, for encoding, decoding, modulating, or demodulating a radiated wave to be transceived by the antenna array.

18. The communication apparatus according to claim 17, wherein the communication apparatus is a wireless access point, a base station, a mobile phone, a wireless network card, or a netbook.

* * * * *